April 17, 1934.   O. C. BOTZ   1,955,669
REFRIGERATING APPARATUS
Filed July 31, 1931    5 Sheets-Sheet 1
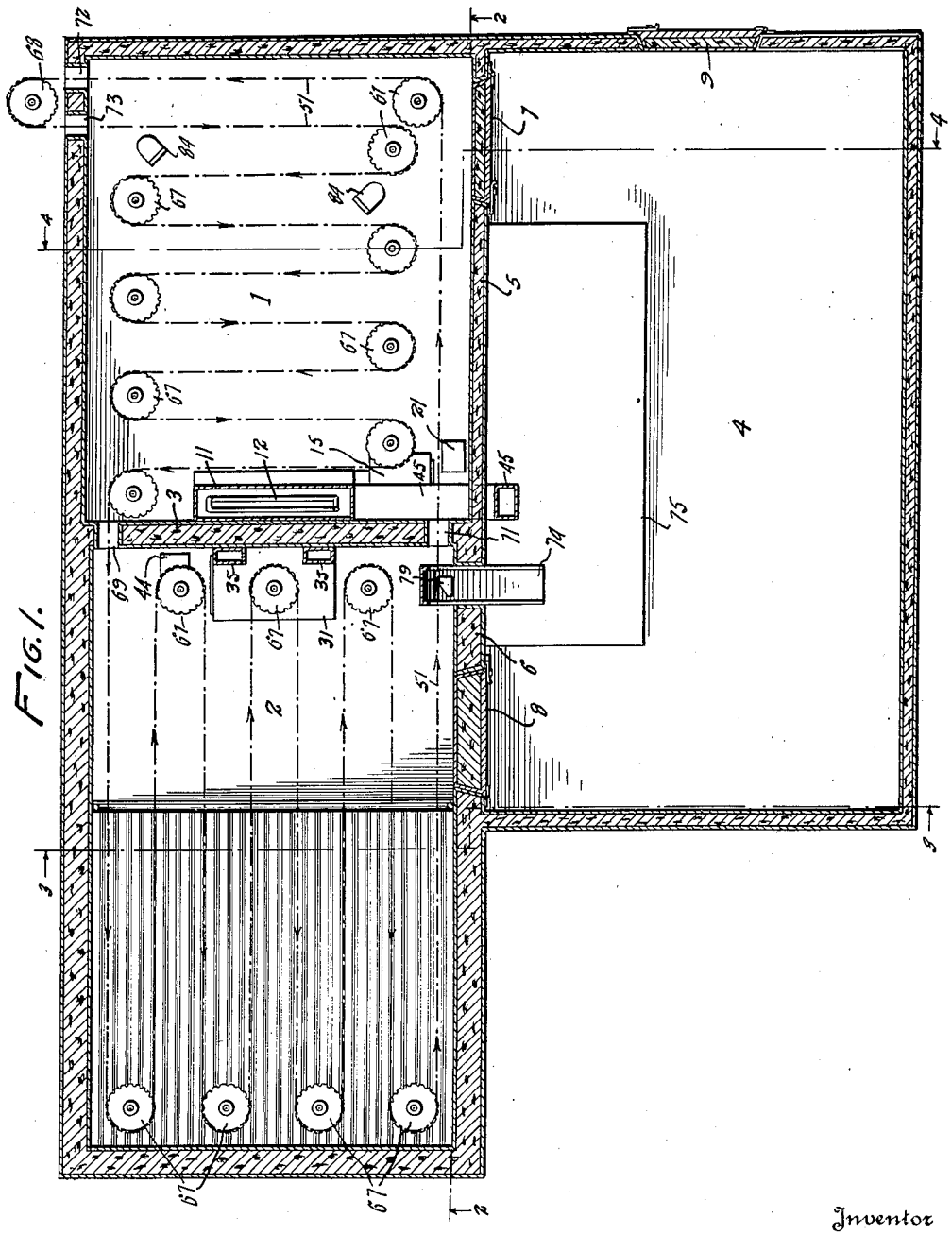
Inventor
OTTO C. BOTZ
By Semmes & Semmes
Attorneys

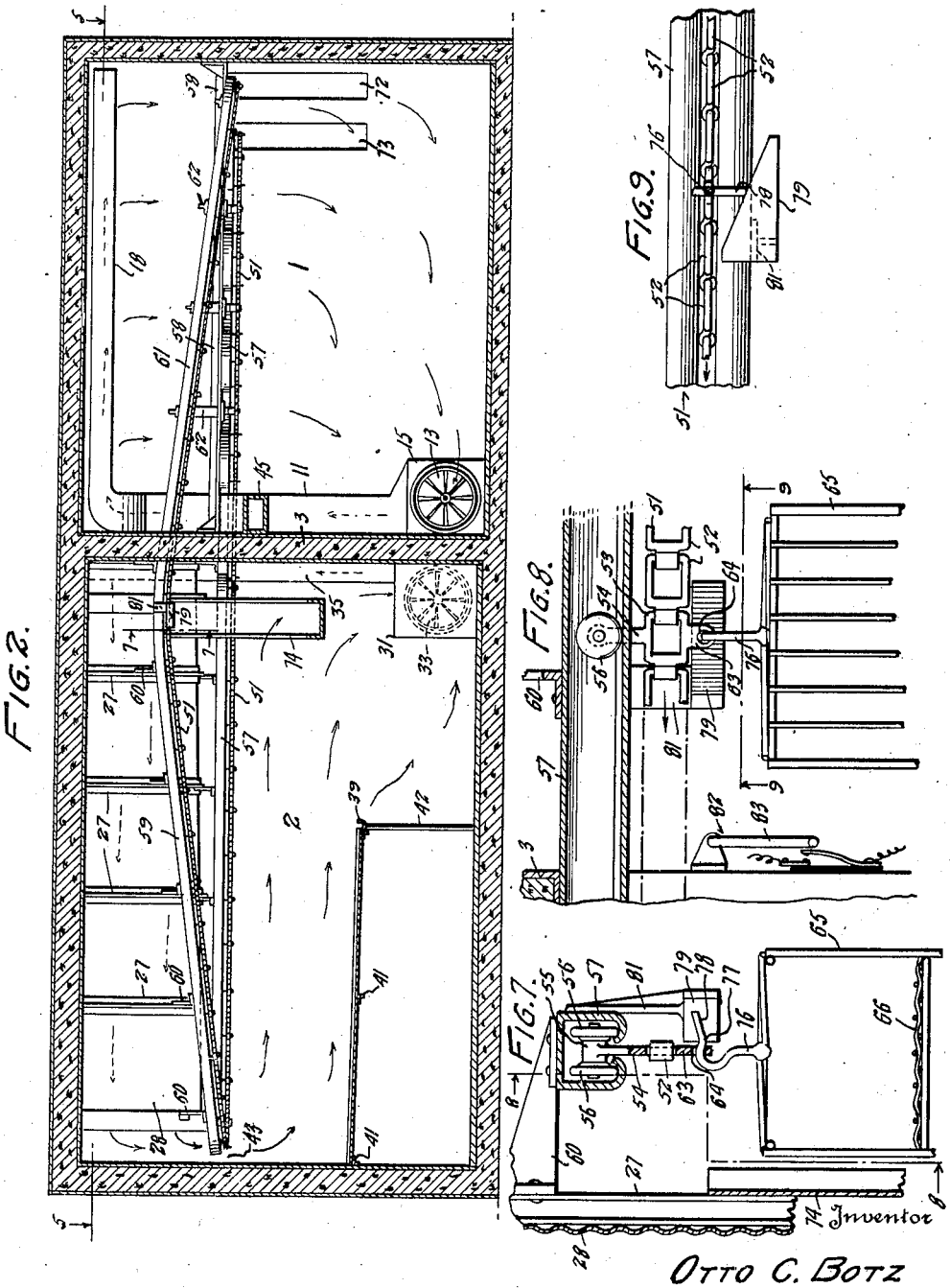

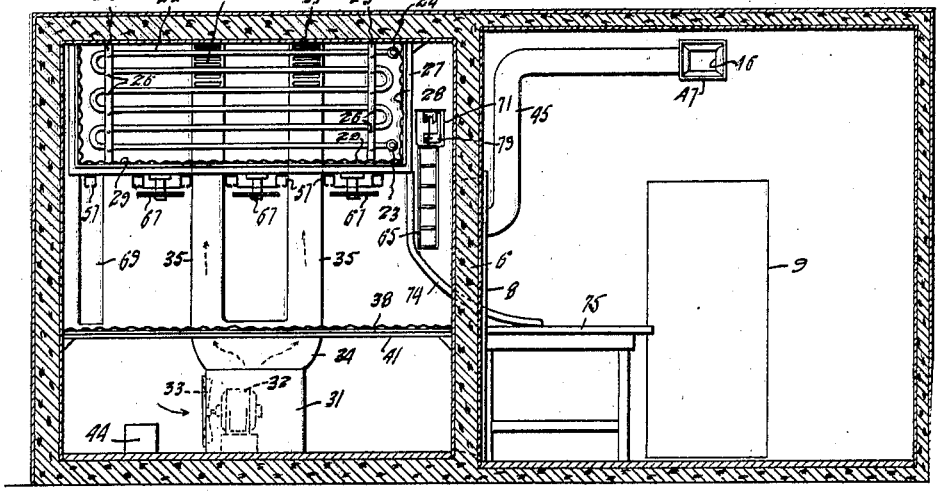
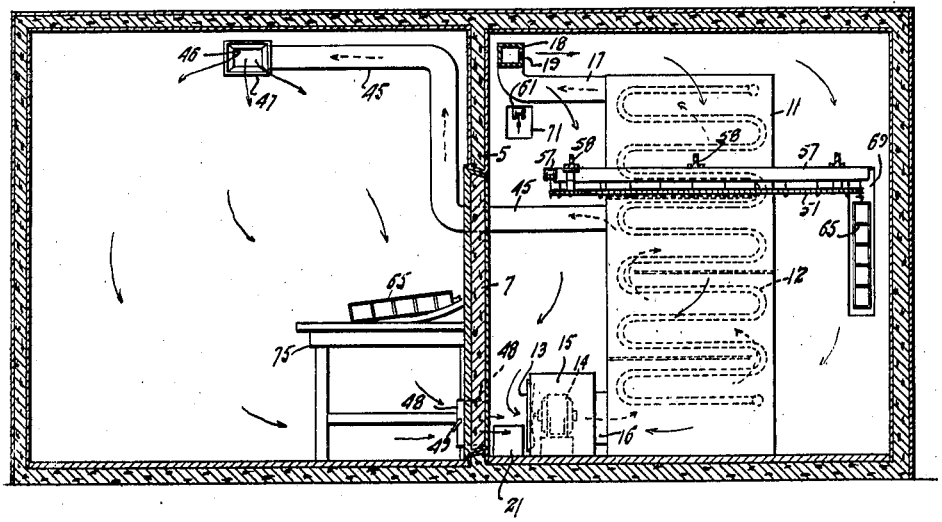

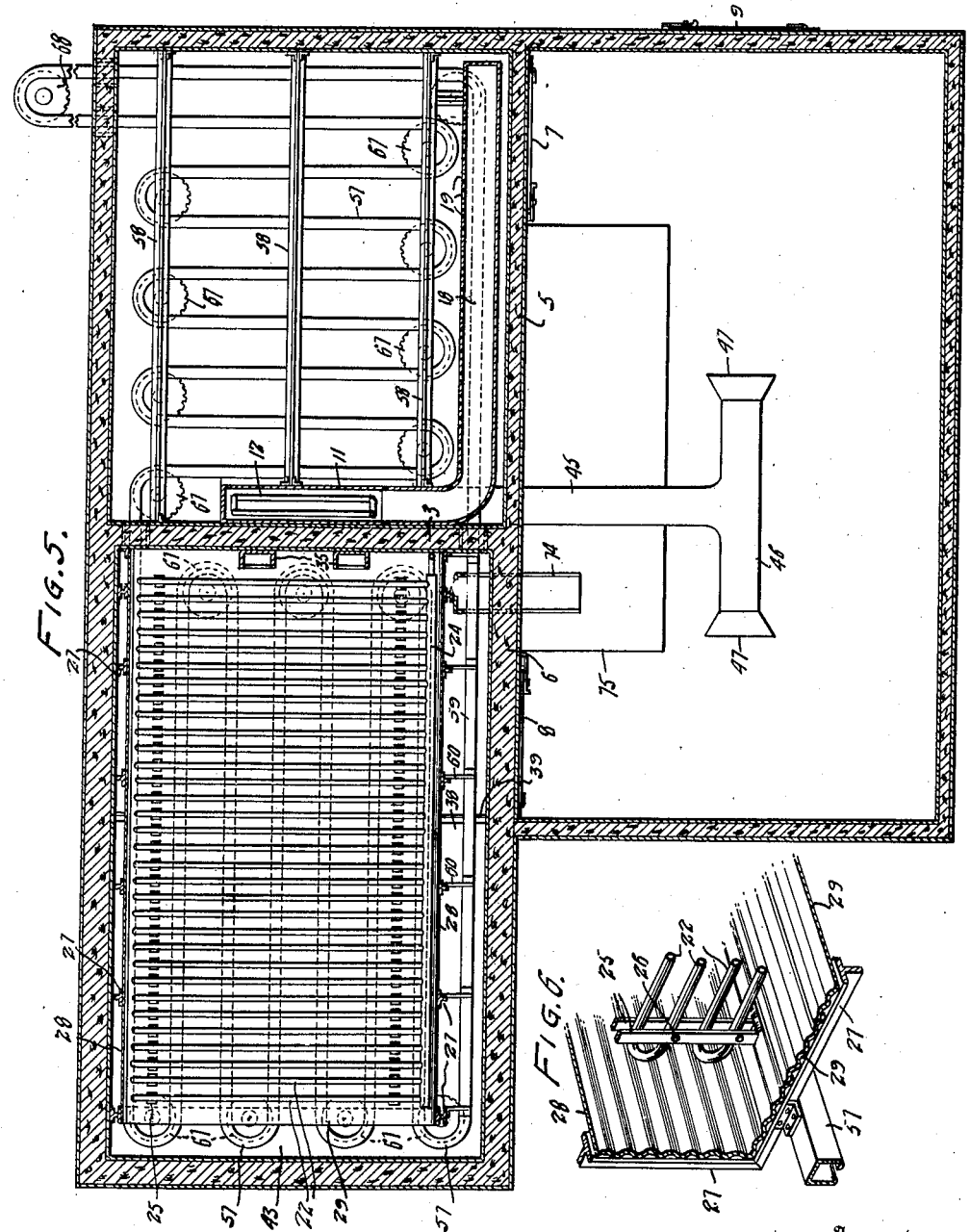

April 17, 1934.  O. C. BOTZ  1,955,669
REFRIGERATING APPARATUS
Filed July 31, 1931   5 Sheets-Sheet 5
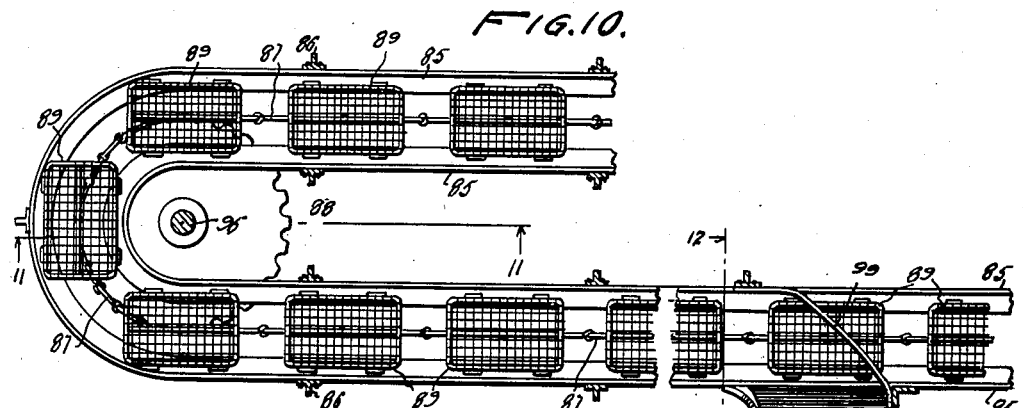
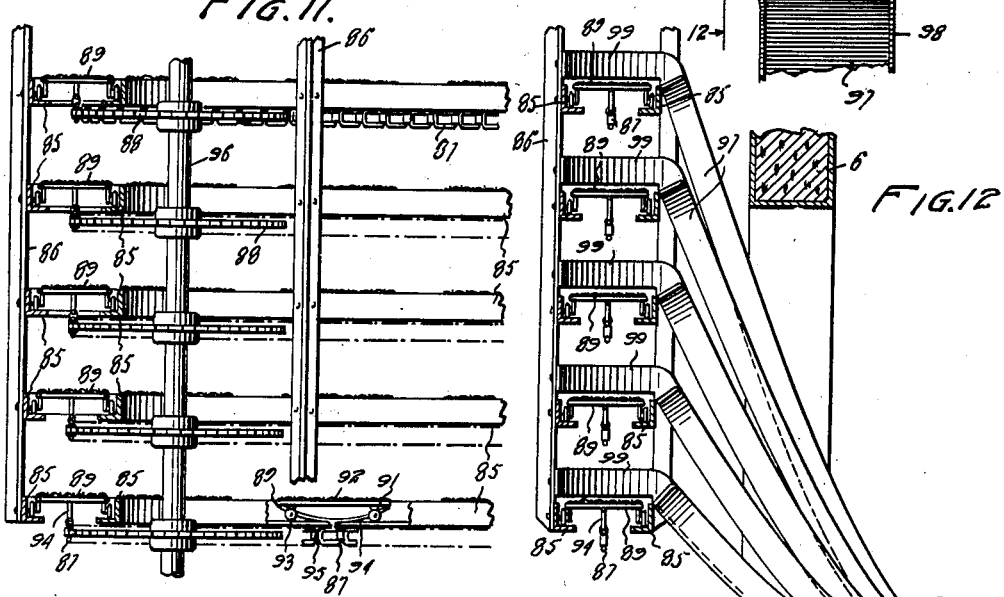
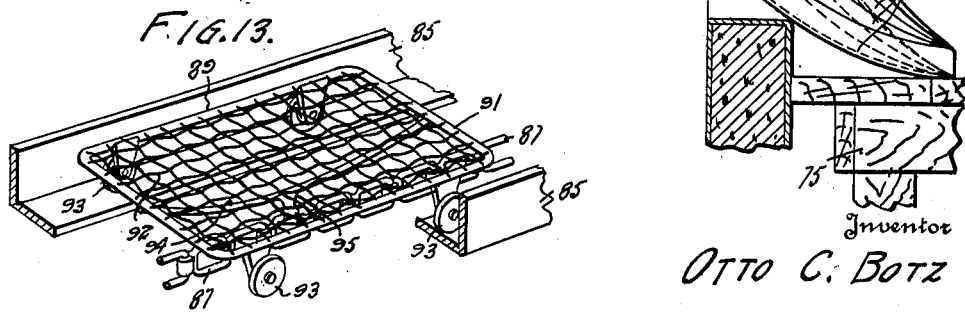
Inventor
OTTO C. BOTZ
By Semmes & Semmes
Attorneys Patented Apr. 17, 1934

1,955,669

UNITED STATES PATENT OFFICE 1,955,669

REFRIGERATING APPARATUS

Otto C. Botz, Jefferson City, Mo.

Application July 31, 1931, Serial No. 554,333

2 Claims. (Cl. 62—1)

This invention relates to the art of refrigeration, and more particularly has reference to the freezing of poultry, especially young fully-drawn chickens.

It has been my desire to supply the consumer fully drawn fresh young chickens. In order to accomplish this, I have found it imperative to subject the chickens, very shortly after killing, to the proper refrigerating treatment. To secure a product of the desired characteristics I found it necessary to devise the process which forms the subject matter of the present invention. The methods heretofore employed for the preservation and freezing of meats and poultry generally, I find to be insufficient.

Fully drawn poultry possesses palatable qualities superior to the so-called "New York dressed" poultry in which merely the feathers are removed from the bird leaving the entrails and head and feet intact until just before cooking. If the entrails remain in the poultry for any considerable period after killing, the flavor of the entrails permeates the rest of the meat, thus detracting from the edibility of the fowl. On the other hand, fully drawn poultry presents certain difficulties with respect to preservation. It seems that upon removal of the entrails the fowl is more amenable to deterioration, which propensity, however, may be avoided by proper refrigeration, such as forms the subject matter of the present invention.

Conventional refrigerating methods such as heretofore employed, I have found to be insufficient. Such methods do not extract the body moisture sufficiently prior to actual freezing. The presence of body moisture in the "New York dressed" poultry is not so detrimental as in the case of fully drawn poultry. Body moisture seriously impairs the edible qualities of fully drawn fowls.

Both with respect to fully drawn and "New York dressed" poultry, it is, of course, obvious that under most circumstances the fowls will be preserved if they are constantly maintained in a refrigerating atmosphere. It is my desire, however, to provide a refrigerating process whereby after suitably subjecting poultry to it, the poultry may be removed into a non-refrigerating atmosphere and maintained for a considerable period of time without injury to the fowl. In other words, I desire to devise such a process that a chicken may be treated after killing and then shipped without additional refrigeration to distant points. I have found that the prior processes are inadequate in this respect, but that by my process the treatment is sufficient to preserve chickens without further refrigeration for days after removal from the refrigerator.

More specifically, the present methods of refrigeration do not afford a sufficient exposure of the treated material to the refrigerating medium. In these processes, large portions of the poultry are in contact with each other or with a container or support. This results in an uneven or non-uniform freezing of the fowl, with certain portions insufficiently frozen, which, upon removal from the refrigerator form focal points for decay. Again the prior processes do not provide for proper circulation of the refrigerating medium with the consequent tendency for the air, or medium, in the vicinity of the material undergoing treatment to become saturated. Usually the only factor tending to prevent stagnation is the circulation of air resulting from differentials in temperature, or at the most, the circulation of air by blowers, etc.

Furthermore, the prior processes are uneconomical in that there is a waste of space, time, and manual labor. Such processes operate on a batch principle in which a certain number of fowls in crates are manually placed in the refrigerating chamber and left there for a desired period of time, after which they are manually removed and a new batch inserted. Obviously, this necessitates a considerable amount of labor and rather lengthy operating periods for the refrigerating apparatus during the time the batches are changed. Also, there are certain thermal losses with each change of batch by virtue of the door of the chamber being opened.

An object of my invention is to overcome the disadvantages inherent in the former processes and apparatus.

Another object of my invention is to provide a process and apparatus for the efficient freezing or refrigeration of fully drawn poultry.

Another object of my invention is to provide a process and apparatus relatively inexpensive of operation, without sacrificing the efficiency thereof.

A further object of my invention is to devise a process and apparatus which is largely automatic in operation.

Yet another object of my invention is to devise a process and apparatus for freezing poultry whereby all of the food qualities are preserved.

To accomplish the foregoing, and other important results as will be apparent hereinafter, my invention in general comprises pre-chilling to remove body heat from poultry such as fully drawn young chickens and to extract the excess body moisture. This preliminary step is followed by actual freezing for a period sufficient to insure preservation of food. After freezing, the chickens are packed in suitable bags or packages at a temperature substantially that of the prechilling step. After packaging the chickens may be held until desired. More specifically, fresh chickens or other food products, are passed through the pre-chill and refrigerating stages on a conveyor at a substantially uniform rate of speed. The conveyors are so constructed as to afford a minimum contact with the chickens and provide ample opportunity for free and thorough circulation of air about all portions of each chicken. The rate of speed and length of the conveyor in the pre-chill chamber is such as to effect a withdrawal of all of the body heat and the excess moisture of the chicken. Likewise in the freezing compartment, the rate of speed and the length of the conveyor is sufficient to effect the desired freezing.

In both pre-chilling and freezing of the chicken the temperature of the chicken is reduced by contact with cold, fresh, clean air, which is maintained in constant circulation. At no time does the chicken come in direct contact with any refrigeration pipes or other chilling objects.

From the freezing room the chickens are automatically diverted to the packing compartment, where the chicken is suitably packed and prepared for shipping. While under certain circumstances the time of exposure and temperature may vary, I find preferable an exposure of approximately an hour in the pre-chill room at a temperature of substantially 40° Fahrenheit. In the freezing room the chickens are subjected to a temperature of less than 20° F., for a period of about one hour and a half. The above statements are for young fully drawn chickens which have been killed and drawn immediately prior to the refrigerating.

While I refer here to chickens, particularly to fully drawn, young chickens, it is to be understood that under certain circumstances, my invention is applicable to various other food products where similar conditions obtain.

To insure a more adequate comprehension of my invention, reference is made to the accompanying drawings which depict one embodiment of my invention, it being of course understood that various modifications may be made in the construction without departing from the spirit and scope of the invention.

In the drawings:

Figure 1 is a sectional view looking down upon the complete apparatus of my invention;

Figure 2 is a section along line 2—2 of Figure 1 looking in the direction of the arrows;

Figure 3 is a cross sectional view along the line 3—3 of Figure 1 looking in the direction of the arrows;

Figure 4 is a cross sectional view along the line 4—4 of Figure 1 looking in the direction of the arrows;

Figure 5 is a sectional view along the line 5—5 of Figure 2 looking in the direction of the arrows;

Figure 6 is a detailed perspective view of the refrigerant conveying pipes and their mountings;

Figure 7 is a detailed view of one portion of the conveying system depicting the automatic means for removing the poultry cages from the conveyor;

Figure 8 is a view partly in section along the line 8—8 of Figure 7;

Figure 9 is a plan view along the line 9—9 of Figure 8 looking in the direction of the arrows.

Figure 10 is a plan view of a modified conveyor.

Figure 11 is a horizontal section on line 11—11 of Figure 10.

Figure 12 is a vertical section on line 12—12 of Figure 10.

Figure 13 is a perspective view of one of the carriers.

Referring particularly to Figure 1, the structure comprises a prechill room 1 and a refrigerating chamber 2, separated by an insulated wall 3. There is also provided a packing room 4, separated from the prechill and refrigerating rooms by walls 5 and 6 respectively. A door 7 offers communication between the packing and prechill rooms, and a door 8 serves the same purpose between the packing and freezing rooms. Entrance to the complete assembly is afforded by a door 9 opening into the packing room. The various walls, as well as the ceilings and floors of the three rooms, are suitably insulated against the passage of heat, and are provided with several layers of corkboard or other appropriate insulation. The doors are likewise composed of insulating material and are so constructed generally as to prevent heat exchange.

The refrigerating apparatus for the prechill room comprises an air cooling box 11, as best shown in Figure 4. Within the box 11 are banks of refrigerant-conveying pipes 12 which receive a refrigerant such as ammonia or some other appropriate medium from a compressor, not shown in the drawings. The refrigerant is compressed, and the pressure released just prior to entering the refrigerating system. A suction fan 13, driven by a suitable motor 14, is housed in an intake box 15 connected to the base of the cooling box 11 by a short section of conduit 16. The air is sucked into the suction box 15 and directed to the base of the cooling box 11, where it ascends, passing over and around the bank of coils 12 housed in the box.

At the top of the cooling box 11 there is an outlet conduit 17 which is connected to an exhaust conduit 18 which runs lengthwise of the prechill room adjacent the ceiling thereof. It will be observed that the exhaust conduit 18 is in proximity to the wall 5 which separates the prechill and packing rooms; and in that side of the conduit remote from such wall there are spaced discharge openings 19 through which the cooled air is forced into the prechill chamber.

The circulation of the air thus set up in the prechill room is apparent. The air from the room, after it has been spent, is sucked into the box 15 and directed to the lower portion of the cooling box 11. In ascending through the box 11, the air is chilled, and then forced out through conduit 17 to exhaust conduit 18. The chilled air then enters into the chamber by way of discharge openings 19, and is directed across the chamber generally. The cool air at the top of the chamber descends, and in passing over and around the chickens undergoing treatment on the conveying system, which will be described hereinafter, extracts the body heat and some of the body moisture therefrom. The air is then sucked into the suction box 15 and the cycle repeated. If desired, a conventional ozone machine may be positioned in the prechill room, preferably, though not necessarily, near the suction box 15. Such a machine is designated by the numeral 21.

The refrigerating apparatus for the freezing room is best disclosed in Figures 3 and 5. It will be observed that the system is made up of a plurality of banks of convoluted coils 22, each coil extending upwardly.

Each of the coils is supplied with a refrigerant, on which the pressure has been released, by an inlet header 23. The refrigerant, in substantially the gaseous phase, ascends through the various coils 22 and passes into an outlet header 24 which conveys the refrigerant to a compressor (not shown in the drawings) where it is recompressed. As in the case of the prechill room, any suitable refrigerant, such as ammonia, may be employed.

It will be observed that the cooling coils in the freezing room are positioned in the upper part of the chamber. Various means may be employed for securing these coils, but I have shown in the drawings a bracket 25 at substantially each end of each coil, in which the coils are clamped by suitable bolts 26. The brackets preferably are suspended from the ceiling of the chamber, although under certain circumstances they may be supported from their base. I find it desirable to suspend them from the ceiling in view of the housing which I provide for these coils.

As best shown in Figures 3 and 6, a casing surrounds the bank of coils, extending from the wall 3 to substantially, but not completely, the opposite wall. Suitable rectangular brackets 27 depend from the ceiling at intervals along the length of the freezing chamber. Each bracket may be integral, or may be composed of separate vertical members, to the base of which may be secured transverse bars.

To the side member of these rectangular brackets there are secured walls 28, which extend from the base of the brackets to the ceiling of the freezing chamber. These walls are preferably, though not necessarily, composed of corrugated sheets.

The transverse portions of the brackets 27 support a sheet or sheets 29 of corrugated metal similar to the sheets 28. As shown in Figure 6, I find it preferable to use a plurality of sheets 29 instead of a single member, and to merely rest such sheets upon the transverse bar of the bracket 27 rather than fixedly securing such sheets to the bracket. Such an arrangement permits the removal of a portion of the floor of the casing to afford access to at least the lower sections of the bank of pipes 22, in case of repair or for other reasons; and also removal of such portion may be desirable under certain circumstances to vary the circulation within the freezing chamber, as will be hereinafter pointed out.

As disclosed in Figure 5, the banks of coils 22 do not extend the full length of the freezing chamber, particularly at the end opposite to the prechill room, and as heretofore mentioned, the casing for the refrigerating coils likewise terminates short of that wall.

The mechanism for circulating the air within the freezing room consists of an intake box 31 in which is housed a motor 32 and a suction fan 33 driven by the motor. The intake box 31 is in open communication with a conduit 34 which is bifurcated to constitute two separate channels 35 for the air. The channels 35 extend to substantially the ceiling of the freezing room, and in their upper extremities are provided with slotted discharge openings 37, which face the bank of cooling coils 22. The channels 35 pass through the cooling coil casing in a relatively close fit.

As disclosed in Figures 1, 2 and 3, a tray or shelf 38 extends longitudinally of the chamber from the end remote from the prechill room to substantially the door 8. This shelf 38 is slightly inclined, as indicated in Figure 2, and is preferably composed of a sheet of corrugated metal. This shelf 38 serves as a drain for any moisture that may condense in that section of the freezing room, and also as a guide for the air current. A trough 39 may be provided at the free end of the tray to collect and divert any moisture upon the tray. The tray 38 may be supported by crossbeams 41 secured to the side walls of the freezing chamber and by props or legs 42 at the free end of the tray.

The current of air set up in the freezing room is as follows: Air is drawn in by the suction fan 33 to the intake box 31, and forced in two ascending columns through the conduits 35. It passes out from the conduits 35 through the openings 37 and is directed over the banks of refrigerant-conveying coils 22. By providing two conduits 35, I am enabled to disperse the air more uniformly over the coils 22, thus making for more efficient chilling of the air. The pipe casing confines the air to the coils 22 for substantially the full length of the refrigerating coils. The air, after exit from the casing, passes downwardly through the space 43 between the free end of the casing and the adjacent wall. The chilled air then passes in a reverse direction toward the intake box 31, and is confined between the base of the casing and the tray 28. Within this confined space, the poultry undergoing treatment is passing. After passing the length of the tray 38, the air is free to drop lower, and thus be drawn into the intake box 31 again for recirculation, as just described.

As in the case of the prechill compartment, an ozone machine 44 may be employed in the freezer. This machine may be positioned at various locations within the freezing compartment, but I find it preferable to place it near the intake box 31.

The temperature and circulation of air within the packing chamber may be effected by an independent apparatus such as I employ in the prechill and refrigerating compartments. However, I have found that I can employ the cooling box 11 of the prechill compartment to chill the air for the packing room. As shown in Figure 4, I provide a conduit 45 which is joined into the cooling box 11 intermediate its height. A portion of the air undergoing chilling in the box 11 is therefore withdrawn and passes through conduit 45 to discharge conduit 46 which is teed into conduit 45 at substantially the middle of the packing compartment. The chilled air is therefore forced in opposite directions and passes out of the conduit 46 through flared mouths 47 into the packing compartment. It will be observed that the conduit 46 is positioned close to the ceiling of the packing chamber, and the provision of the two discharge mouths 47 insures a distribution of the air throughout the packing compartment.

The air is free to circulate in the packing compartment, and the spent air returns to the prechill room through the opening 48 provided in the base of wall 5. The opening 48 is provided with a damper arrangement 49 in order to regulate the amount of air passing through the opening.

The temperature of the packing chamber, in the ordinary operation of my process, is substantially that of the prechill room, namely, approximately 40°, but this temperature can be varied by manipulation of the damper 49. Closing of the damper prevents the exhaust of spent air from the packing chamber, and therefore raises the temperature.

The circulation of air within the packing chamber is apparent. As heretofore pointed out, a portion of the air which is chilled in the cooling box 11 is diverted to the packing chamber, where it is discharged through the mouths 47. This air circulates through the packing chamber, and is withdrawn through the opening 48, from whence it is picked up by the suction fan 13 and rechilled.

As heretofore pointed out, I provide automatic means for handling poultry while it is undergoing the refrigerating process. I provide a conveyor of the endless chain type, as shown diagrammatically in Figure 1 and designated generally 51. More specifically, this conveyor chain is made up of a plurality of links 52 pivoted to each other. At intervals in the chain thus constructed, there is inserted a link 53 which has an upwardly extending arm 54, as shown in detail in Figures 7 and 8. The arm 54 is provided with an enlarged head 55 at the free end, which forms a journal for rollers 56. The rollers 56 are adapted to run in a rail 57 which, in effect, is made up of a channel bar with the free ends bent in to form runways for the rollers 56, as disclosed in Figure 7.

The rails 57 are supported in various ways. For instance, in the prechill room, they are supported by beams 58, which run lengthwise of the chamber. In the freezing room, the rails are secured to the brackets 27, except that section of the rail nearest the wall 6. It will be observed that this section of the rail is inclined as indicated at 59, for a purpose which will be hereinafter described, and is supported by suitable braces 60 which may either be secured to the straps 27, as disclosed in Figure 2, or by arms extending from the ceiling. The section of the rail in the prechill room closest to the wall 5 slopes downwardly, as indicated at 61, and the supports 62 therefor may either be secured to the beams 58, or may be suspended from the ceiling.

As shown in Figure 8, the links 53 are also provided with depending lips 63 apertured as at 64. A basket or cage for carrying the poultry to be treated is indicated generally by numeral 65, and for a more detailed description of this case, reference is made to the applicant's copending application Serial No. 544,206, filed June 13, 1931. These cages are constructed of meshed wire, as indicated by numeral 66, in Figure 7. As shown in Figure 3, each cage is composed of 5 horizontal compartments, each one adapted to contain a fowl. The size of these compartments is such as to prevent the contact of any one fowl with another, and there is a minimum contact of the fowl with the container, by virtue of the meshed construction. Substantially all of the fowl is therefore exposed to the chilled air, thus affording a free circulation of the air over and around each chicken, with a consequent efficient freezing.

Referring to Figures 1 and 5, it will be observed that the conveying system follows a convoluted path. At each of the curves in the path, there is positioned a sprocket 67 which meshes with the chain 51. In addition to the sprocket 67 located in the prechill and refrigerating chambers, there is a driving sprocket 68 located just outside of the prechill room. A suitable source of power (not shown) is provided to drive the sprocket 68 and thus operate the conveying system. While not disclosed in the drawings, it is desirable to maintain the sprocket 68 so that it is slidable radially, to compensate for expansion and contraction of the conveying system with changes in temperature.

It will be observed that the conveyor in the prechill room travels from side to side thereof, while in the refrigerating chamber it travels generally in a longitudinal direction. As disclosed in Figures 1 and 3, there is an opening 69 in wall 3 through which the baskets and conveyor pass from the prechill room to the refrigerating room. This opening is confined to a space merely sufficient to permit the passage desired, and is not large enough to cause any appreciable amount of air to pass between the chambers. An opening 71 is also provided for the passage of the conveyor from the freezing room to the prechill room. As disclosed in Figure 4, this opening is merely sufficient for the passage of the rail and chain, but of course it may be of the same size as opening 69. Canvas aprons may be placed over these openings in order to further restrict the passage of any air, and thus to maintain the temperatures of the prechill and freezing chambers at the desirable levels, while at the same time permitting the passage of the cages therethrough. Openings 72 and 73 are also provided for the passage of the conveyor and baskets to and from the drive sprocket 68.

I have provided a means for automatically transferring the cages and their contents from the freezing room to the packing room, after the poultry has been sufficiently treated. This means comprises a chute 74 which extends downwardly from the refrigerating coil casing, through an opening in wall 6, to the packing compartment. It is desirable to position a table 75 at the discharge end of the chute 74 to receive the baskets as shown in Figure 4.

The baskets, it will be observed, are provided with hooks 76 which pass through the apertures 64 in the lips 63. The hooks have a lip-engaging portion provided with a hump 77 and upwardly slanting portion 78. Immediately opposite the chute 74, and at the same level as the lip 63 on link 53, there is provided a cam plate 79 supported from the rail by a bar 81. The cam surface is so disposed that as a cage approaches the chute 74, the tip of the hook 76 contacts with the cam, and as the movement continues, the hook is disengaged from the lip 63. The cage then falls upon the chute 74 and is directed to the table 75.

If, perchance, the cage is not removed from the conveyor, I have provided automatic means for stopping the operation of the conveying system. This means is designated generally 82, and in the form shown there is merely provided an arm 83 which is moved by contact with the cage to close the circuit, which in turn stops the actuating machinery, or which may merely break the circuit by which the prime mover is actuated. In this connection it might be pointed out that the opening 71 may be of the same size as the opening 69, for the automatic shut-off will prevent the return of frozen poultry to the prechilling room. Various other forms of shut-off may be employed, of course, and the one depicted in Figure 8 is merely illustrative.

As heretofore pointed out, that portion of the conveyor rail closest to walls 5 and 6 is inclined to a point immediately above the chute 74. This is merely for the purpose of raising the cages to a sufficient level so that they may slide down to the table 75 by the force of gravity.

I have found that certain desirable qualities of poultry are enhanced by subjecting the poultry to the action of ultra-violet rays during the refrigerating treatment. Accordingly, there are shown in Figure 1 ultra-violet ray lamps 84 which I position in the prechill room. While there are only two such lamps disclosed, more may be employed if desired. These lamps are so positioned that the rays therefrom are directed on both sides of the poultry passing through the prechill chamber.

In Figures 10 through 13, I have shown a modified form of conveyor which may be used in lieu of the conveyor heretofore described. In the alternative form, there are provided a pair of angle bars 85 regularly spaced apart to form rails. These angle bars are supported from the ceiling by means of arms 86 depending therefrom. A chain 87, substantially similar to the chain heretofore disclosed, is provided, and is held intermediate the rails 85. At those places where the rails are curved, sprockets 88 are provided to guide the chain 87.

A plurality of cars or plates 89 carry the poultry to be treated. These cars are composed of a frame 91 to which is suitably secured a strip of meshed wire 92. Rollers 93, adapted to run in the tracks 85, support the car or plate. A bowed arm 94 depends below the car or plate, provided with a projection 95 which is integral with certain of the links of the chain.

As shown in Figure 11, I provide five tracks, disposed one above the other, and the sprockets 88 may be mounted upon a single shaft 96. It will be observed that this arrangement affords the same capacity for treatment of the chickens as does the cage form of conveyor. Each of the chains may be driven by a power sprocket such as sprocket 68, shown in Figure 1, and means may be provided for selectively operating each of the chains. The poultry to be treated is placed upon the plates 89, one chicken to each plate, and this conveyor may be operated at any desired speed, as in the case of the cage conveyor.

The modified means for transferring the chickens from the conveyor to the packing room is disclosed in Figures 10 and 12. This apparatus comprises a chute 97, which slopes downwardly from the rail of the conveyor to the table 75. Flanges 98 are provided at the sides of each chute to prevent the chickens from falling off. The flange on the opposite side from which the plates approach is continued as shown at 99, and slants from the chute across the path of the conveyor toward the oncoming plates. As each car comes up to the continuation 99, the chicken carried thereon is eased over onto the chute by the continuation, and upon reaching the chute proper, slides down onto the table 75 by gravity.

It will be observed that a chute is provided for each of the rails, and the disposition of the several chutes is optional. They may be staggered longitudinally with respect to the respective rails with which they are connected, or the points of attachment to the rails may be in a verical plane, with the discharge ends of the chutes bent and staggered upon a common horizontal plane. It is of course advisable that the floor of the chute 97 be composed of a material that is relatively free from oxidation, and that its surface be maintained in a clean and polished condition.

The operation of my process and apparatus is believed to be apparent from the foregoing description. The cages are loaded, one chicken to each compartment, and the loaded cages hooked onto the links 53. Or, if the form of conveyor disclosed in Figures 10–13 is employed, the individual plates are loaded. This loading takes place outside of the refrigerating plant, in the vicinity of drive sprocket 68. The conveying mechanism has of course been started at the time the loading is commenced, and the cages with their contents pass through the prechill room along the path of the conveyor 51. The air which has been chilled in the cooling box 11 is discharged through the openings 19 and passes over and around the chickens while the latter move through the prechill room.

As heretofore pointed out, there is a constant circulation of air within the prechill room, the air being alternately chilled, discharged into the room, and drawn through the chilling box 11. It is also to be noted that, even if there were no circulation of air, the chickens during their passage through the room would be in constant motion, with consequent contact of the chickens with fresh air as they progressed. There would, therefore, be no opportunity for the air within the vicinity of any chicken to become saturated or stale. Furthermore, the ozone machine purifies the air prior to passage through the cooling box. During their passage through the prechill chamber, the chickens are subjected to the ultra-violet rays from lamps 84, the positioning of the lamps being such as to throw their rays upon the entire chicken.

I have found that an exposure of fully-drawn young chickens to a temperature of approximately 40° Fahrenheit such as is maintained in the prechill room, for a period of approximately one hour, is sufficient to remove the body heat of the bird and the required body moisture. In general, the treatment in this stage renders the poultry particularly amenable to the freezing step which follows.

From the prechill room 1, the cages pass through the opening 69 to the refrigerating room 2. The temperature in this room is maintained at substantially 20° Fahrenheit. Here again, they follow a path for a sufficient period to insure proper freezing. Particularly when the baskets are over the tray 38, the chickens are in a current of chilled air which has been passed over the coils 22. The circulation set up in this chamber insures that the air is in constant motion, and that the chickens are being bathed in fresh currents of air.

When the cages reach the chute 74, they are automatically disengaged from the conveyor, and slide to the table 75 in the packing room. In the packing room, the chickens are graded and culled, and placed in individual waxed paper or cellophane packages. I have also found that parchment paper as well, or glassine packages are well adapted for this purpose. These packages are held in the packing room until the time of shipment.

The length of time for which the chickens are maintained in the prechill room and in the refrigerating room is of course the function of the length of the conveyor in the respective rooms, and the rate of speed of the conveyor. Again, in determining the length of the conveyor, it is necessary to bear in mind the desired capacity. A maximum capacity for a given space is afforded by my invention, in view of the construction of the cages or plates and the arrangement of the conveyor in the two chambers. The speed of the conveyor is therefore controlled to afford the desired time of treatment.

It will be observed that the treatment to which the poultry is subjected by my process is such that substantially all of each chicken is exposed to to the chilled air, and is sufficient to prevent deterioration of the meat for a considerable period after removal from the refrigerating apparatus. In the prechill room, the body heat of the freshly slaughtered chickens is extracted, together with excess body moisture. The subsequent freezing of the meat in the refrigerating room completes the refrigeration step and renders the product in condition for shipment, without the use of additional refrigeration. This is true even though the poultry be fully drawn.

It will also be observed that the refrigerating process is automatic throughout, requiring manual labor only in the loading of the cages or plates, and in the packaging. This means, of course, that both the prechill and refrigerating rooms need never be entered during the process, thus avoiding loss of temperature. Also, the apparatus and process of my invention are adapted for the treatment of a maximum number of chickens in a minimum of space, and at a considerable saving in cost.

The result of my invention is that I am able to obtain a fully-drawn chicken, of fresh flavor, fully and uniformly frozen and in a condition to be shipped considerable distances without additional refrigeration.

While I have shown and described the preferred embodiment of my invention, I wish it to be understood that I do not confine myself to the precise details herein set forth by way of illustration, as it is apparent that many changes and variations may be made therein by those skilled in the art, without departing from the spirit of the invention, or exceeding the scope of the appended claims.

I claim:

1. A refrigerating apparatus comprising a prechill room, means to extract the body heat and body moisture of freshly slaughtered poultry, a freezing room connected to and in direct communication with the said prechill room, a conveyor adapted to carry the poultry to the prechill and freezing room, a packing room connected to and in communication with both the prechill and freezing rooms, and means for removing the poultry from the conveyor and directing it to the packing room.

2. A refrigerating apparatus comprising a prechill room, means to maintain the temperature thereof at substantially 40° F., a freezing room connected to and in direct communication with the prechill room, means to maintain the freezing room at a temperature of approximately 20° F., a conveyor adapted to carry material undergoing treatment through the prechill and freezing rooms, a packing room in limited communication with the freezing room, and automatic means for removing the poultry from the conveyor in the freezing room and directing it to the packing room.

OTTO C. BOTZ.